US010580433B2

United States Patent
Nomura et al.

(10) Patent No.: US 10,580,433 B2
(45) Date of Patent: Mar. 3, 2020

(54) ELECTRONIC DEVICE, EMOTION INFORMATION OBTAINING SYSTEM, STORAGE MEDIUM, AND EMOTION INFORMATION OBTAINING METHOD

(71) Applicant: CASIO COMPUTER CO., LTD., Shibuya-ku (JP)

(72) Inventors: Keiichi Nomura, Uenohara (JP); Toshiya Sakurai, Itabashi-ku (JP); Hideo Suzuki, Ome (JP); Tsuyoshi Minami, Musashimurayama (JP); Shuhei Uchida, Hamura (JP); Shigeki Kitamura, Iruma (JP); Kimiyasu Mizuno, Akishima (JP); Takashi Suenaga, Setagaya-ku (JP); Munetaka Seo, Fussa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 16/015,016

(22) Filed: Jun. 21, 2018

(65) Prior Publication Data
US 2018/0374498 A1    Dec. 27, 2018

(30) Foreign Application Priority Data

Jun. 23, 2017    (JP) ................. 2017-123200

(51) Int. Cl.
*G10L 25/63*    (2013.01)
*H04R 3/00*    (2006.01)
*G06F 3/16*    (2006.01)

(52) U.S. Cl.
CPC .............. *G10L 25/63* (2013.01); *G06F 3/167* (2013.01); *H04R 3/00* (2013.01); *H04R 2420/07* (2013.01);
(Continued)

(58) Field of Classification Search
CPC ... G06F 3/167; G06F 3/16; G06F 3/01; G06F 17/30; G10L 25/63; G10L 15/22;
(Continued)

(56) References Cited

U.S. PATENT DOCUMENTS

| 5,765,134 A * | 6/1998 | Kehoe ................. G10L 21/0208 381/61 |
| 6,959,080 B2 * | 10/2005 | Dezonno ............... H04M 3/493 379/265.07 |

(Continued)

FOREIGN PATENT DOCUMENTS

| JP | 9-292964 | 11/1997 |
| JP | 2003-110703 | 4/2003 |
| JP | 2009-265852 | 11/2009 |

*Primary Examiner* — Gerald Gauthier
(74) *Attorney, Agent, or Firm* — Cozen O'Conner

(57) ABSTRACT

An electronic device includes an audio receiver which receives audio of a user and converts the audio into audio information, and a processor. The processor performs first obtaining emotion information on a basis of the audio information converted by the audio receiver and second obtaining user-related information or environment information. In the first obtaining, the emotion information is obtained on a basis of the audio information of a predetermined timing which is decided on a basis of the user-related information or the environment information obtained in the second obtaining.

20 Claims, 4 Drawing Sheets

(52) U.S. Cl.
CPC ...... *H04R 2499/11* (2013.01); *H04R 2499/15* (2013.01)

(58) Field of Classification Search
CPC ....... G10L 25/84; G10L 15/00; G10L 15/183; H04R 2499/11; H04R 2499/15; H04R 3/00; G05D 1/00; G06K 9/00; G06K 9/62; A61M 21/02; B25J 11/00; G06Q 30/02; G06N 5/04; G06T 5/20; G09B 25/00
USPC ................ 379/88.01, 265.07; 382/118, 189; 600/300; 704/231, 232, 235, 236, 238, 704/246, 254, 270, 275, 251, 271, 260; 701/36; 715/728; 455/556.1
See application file for complete search history.

(56) References Cited

U.S. PATENT DOCUMENTS

| | | | | |
|---|---|---|---|---|
| 8,407,055 | B2* | 3/2013 | Asano | G10L 17/26 704/270 |
| 8,719,035 | B2* | 5/2014 | Stewart | G10L 17/26 434/159 |
| 8,965,762 | B2* | 2/2015 | Song | G06K 9/00268 382/118 |
| 9,524,732 | B2* | 12/2016 | Kawashima | G10L 25/48 |
| 9,711,056 | B1* | 7/2017 | Nguyen | A61B 5/04847 |
| 9,836,055 | B1* | 12/2017 | Kim | G05D 1/0094 |
| 10,482,352 | B2* | 11/2019 | Osada | G06K 9/6202 |
| 2003/0069728 | A1* | 4/2003 | Tato | G10L 17/26 704/231 |
| 2005/0086055 | A1* | 4/2005 | Sakai | G10L 15/01 704/231 |
| 2008/0195385 | A1* | 8/2008 | Pereg | G10L 17/26 704/231 |
| 2009/0076811 | A1* | 3/2009 | Ofek | G10L 17/26 704/231 |
| 2009/0316862 | A1* | 12/2009 | Sugimoto | G10H 1/0008 379/88.01 |
| 2010/0036660 | A1* | 2/2010 | Bennett | G10L 15/30 704/231 |
| 2010/0041958 | A1* | 2/2010 | Leuthardt | G06F 19/3481 600/300 |
| 2011/0058713 | A1* | 3/2011 | Kogane | G06K 9/00308 382/118 |
| 2011/0172999 | A1* | 7/2011 | Hakkani-Tur | G06F 17/274 704/238 |
| 2011/0196677 | A1* | 8/2011 | Deshmukh | G10L 15/22 704/246 |
| 2011/0282662 | A1* | 11/2011 | Aonuma | G10L 17/26 704/231 |
| 2012/0209606 | A1* | 8/2012 | Gorodetsky | G10L 15/26 704/235 |
| 2012/0239393 | A1* | 9/2012 | Basson | G10L 17/26 704/231 |
| 2013/0080169 | A1* | 3/2013 | Harada | G10L 25/63 704/249 |
| 2013/0117020 | A1* | 5/2013 | Chung | G06Q 30/02 704/235 |
| 2013/0166291 | A1* | 6/2013 | Lech | G10L 17/26 704/232 |
| 2014/0025383 | A1* | 1/2014 | Dai | G10L 13/00 704/260 |
| 2014/0025385 | A1* | 1/2014 | Atri | H04N 21/42203 704/270 |
| 2014/0052441 | A1* | 2/2014 | Fujibayashi | G06F 17/241 704/231 |
| 2014/0112556 | A1* | 4/2014 | Kalinli-Akbacak | G10L 25/63 382/128 |
| 2014/0114655 | A1* | 4/2014 | Kalinli-Akbacak | G10L 25/63 704/231 |
| 2014/0172431 | A1* | 6/2014 | Song | G10L 25/63 704/275 |
| 2014/0222432 | A1* | 8/2014 | Ahn | G10L 15/1822 704/257 |
| 2014/0236593 | A1* | 8/2014 | Wu | G10L 15/14 704/231 |
| 2014/0379352 | A1* | 12/2014 | Gondi | G10L 25/63 704/271 |
| 2015/0154002 | A1* | 6/2015 | Weinstein | G06F 3/167 715/728 |
| 2015/0287403 | A1* | 10/2015 | Holzer Zaslansky | G06T 13/205 704/231 |
| 2015/0310852 | A1* | 10/2015 | Spizzo | G10L 25/48 704/251 |
| 2015/0310865 | A1* | 10/2015 | Fay | G10L 15/22 704/254 |
| 2015/0318002 | A1* | 11/2015 | Karam | A61B 5/7264 704/231 |
| 2015/0339051 | A1* | 11/2015 | Yang | G06F 3/04883 382/189 |
| 2016/0185354 | A1* | 6/2016 | Lisseman | B62D 1/046 701/36 |
| 2016/0232923 | A1* | 8/2016 | Lassche | G10L 25/84 |
| 2016/0240213 | A1* | 8/2016 | Wen | G10L 13/027 |
| 2016/0350801 | A1* | 12/2016 | Vincent | G06Q 30/0251 |
| 2016/0381534 | A1* | 12/2016 | Kwon | H04N 21/42201 455/556.1 |
| 2017/0032186 | A1* | 2/2017 | Murata | G06K 9/00671 |
| 2017/0068507 | A1* | 3/2017 | Kim | G06F 3/14 |
| 2017/0133009 | A1* | 5/2017 | Cho | G10L 15/183 |
| 2017/0270922 | A1* | 9/2017 | Fu | G06F 17/2735 |
| 2017/0301073 | A1* | 10/2017 | Gao | G06F 3/04842 |
| 2017/0351330 | A1* | 12/2017 | Gordon | G06F 1/163 |
| 2018/0047391 | A1* | 2/2018 | Baik | G10L 15/22 |
| 2018/0053503 | A1* | 2/2018 | Ogunyoku | H04W 4/90 |
| 2018/0150130 | A1* | 5/2018 | Fowler | G06F 3/011 |
| 2018/0276281 | A1* | 9/2018 | Asukai | G06K 9/00677 |
| 2018/0285641 | A1* | 10/2018 | Yan | G06F 3/011 |
| 2018/0285752 | A1* | 10/2018 | Yu | G06N 5/04 |
| 2018/0350362 | A1* | 12/2018 | Honda | G10L 15/22 |
| 2018/0374498 | A1* | 12/2018 | Nomura | G10L 25/63 |
| 2019/0336724 | A1* | 11/2019 | Li | A61M 21/02 |
| 2019/0337157 | A1* | 11/2019 | Sun | G10L 25/63 |

* cited by examiner

ELECTRONIC DEVICE, EMOTION INFORMATION OBTAINING SYSTEM, STORAGE MEDIUM, AND EMOTION INFORMATION OBTAINING METHOD

CROSS-REFERENCE TO RELATED APPLICATIONS

This application is based upon and claims the benefit of priority under 35 USC 119 of Japanese Patent Application No. 2017-123200 filed on Jun. 23, 2017, the entire disclosure of which, including the description, claims, drawings, and abstract, is incorporated herein by reference in its entirety.

BACKGROUND OF THE INVENTION

1. Field of the Invention

The present invention relates to an electronic device, an emotion information obtaining system, a storage medium, and an emotion information obtaining method.

2. Description of Related Art

Conventionally, there have been provided various products, services and the like which analyze the sound (audio) that is input by a user, recognize the user's emotion, and utilize the recognized emotion.

For example, there is provided a technique for obtaining emotion information such as whether a user is satisfied with the service provided through the Internet, whether a user has a harsh personality or a generous personality, and the like on the basis of audio information and the like which are input via an audio receiver (see JP H9-292964).

SUMMARY OF THE INVENTION

To achieve at least one of the abovementioned objects, according to an aspect of the present invention, an electronic device includes:
an audio receiver which receives audio of a user and converts the audio into audio information; and
a processor which performs:
first obtaining emotion information on a basis of the audio information converted by the audio receiver; and
second obtaining user-related information or environment information,
wherein, in the first obtaining, the emotion information is obtained on a basis of the audio information of a predetermined timing which is decided on a basis of the user-related information or the environment information obtained in the second obtaining.

According to another aspect of the present invention, an emotion information obtaining system including a terminal device and a server device which is connected to the terminal device via a network, the system includes:
an audio receiver which receives audio of a user and converts the audio into audio information; and
a processor which performs:
first obtaining emotion information on a basis of the audio information converted by the audio receiver; and
second obtaining user-related information or environment information,
wherein, in the first obtaining, the emotion information is obtained on a basis of the audio information of a predetermined timing which is decided on a basis of the user-related information or the environment information obtained in the second obtaining.

According to another aspect of the present invention, a non-transitory computer readable storage medium storing a program for causing a computer to function as:
an audio receiver which receives audio of a user and converts the audio into audio information; and
a processor which performs:
first obtaining emotion information on a basis of the audio information converted by the audio receiver; and
second obtaining user-related information or environment information,
wherein, in the first obtaining, the emotion information is obtained on a basis of the audio information of a predetermined timing which is decided on a basis of the user-related information or the environment information obtained in the second obtaining.

According to another aspect of the present invention, an emotion information obtaining method, including:
audio inputting where audio of a user is input and where the audio is converted into audio information;
first obtaining where emotion information is obtained on a basis of the converted audio information; and
second obtaining where user-related information or environment information is obtained,
wherein the emotion information is obtained in the first obtaining on a basis of the audio information of a predetermined timing which is decided on a basis of the user-related information or the environment information obtained in the second obtaining.

DETAILED DESCRIPTION OF THE INVENTION

Figure 1:
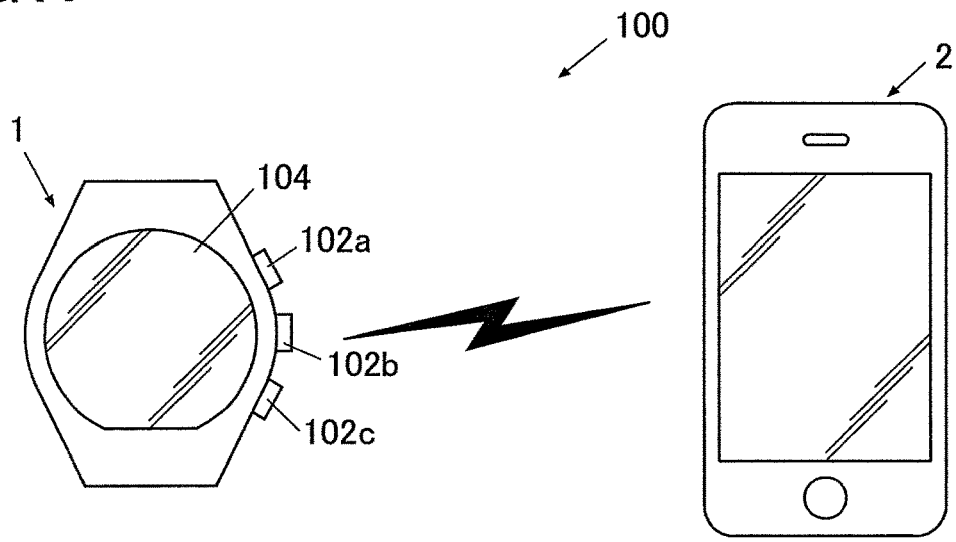
FIG. 1 is a schematic view showing an emotion information obtaining system according to an embodiment.

Hereinafter, an embodiment of the present invention will be described with reference to the drawings. Although the embodiment described below include various limitations that are technically preferred to carry out the present invention, they do not limit the scope of the invention to the embodiments and the examples shown in the drawings.

>>Configuration of the Emotion Information Obtaining System 100>>

First, the configuration according to the embodiment will be described with reference to FIG. 1. FIG. 1 is a schematic view of the emotion information obtaining system 100 according to the embodiment.

The emotion information obtaining system 100 of the embodiment is a system for obtaining emotion information on the basis of audio information of a predetermined timing that is decided on the basis of user-related information and environment information.

As shown in FIG. 1, the emotion information obtaining system 100 includes a smart watch 1 (electronic device) and a smartphone 2, and these devices are connected so as to communicate with each other. Here, although the embodiment includes the smartphone 2, the present invention is not limited to such configuration. That is, instead of or in addition to the smartphone 2, a terminal device such as a tablet terminal, a navigation terminal, a personal computer (PC) or the like, a server device, or the like can be included. Alternatively, the smartphone 2 may be excluded.

<<Configuration of the Smart Watch 1>>

Figure 2:
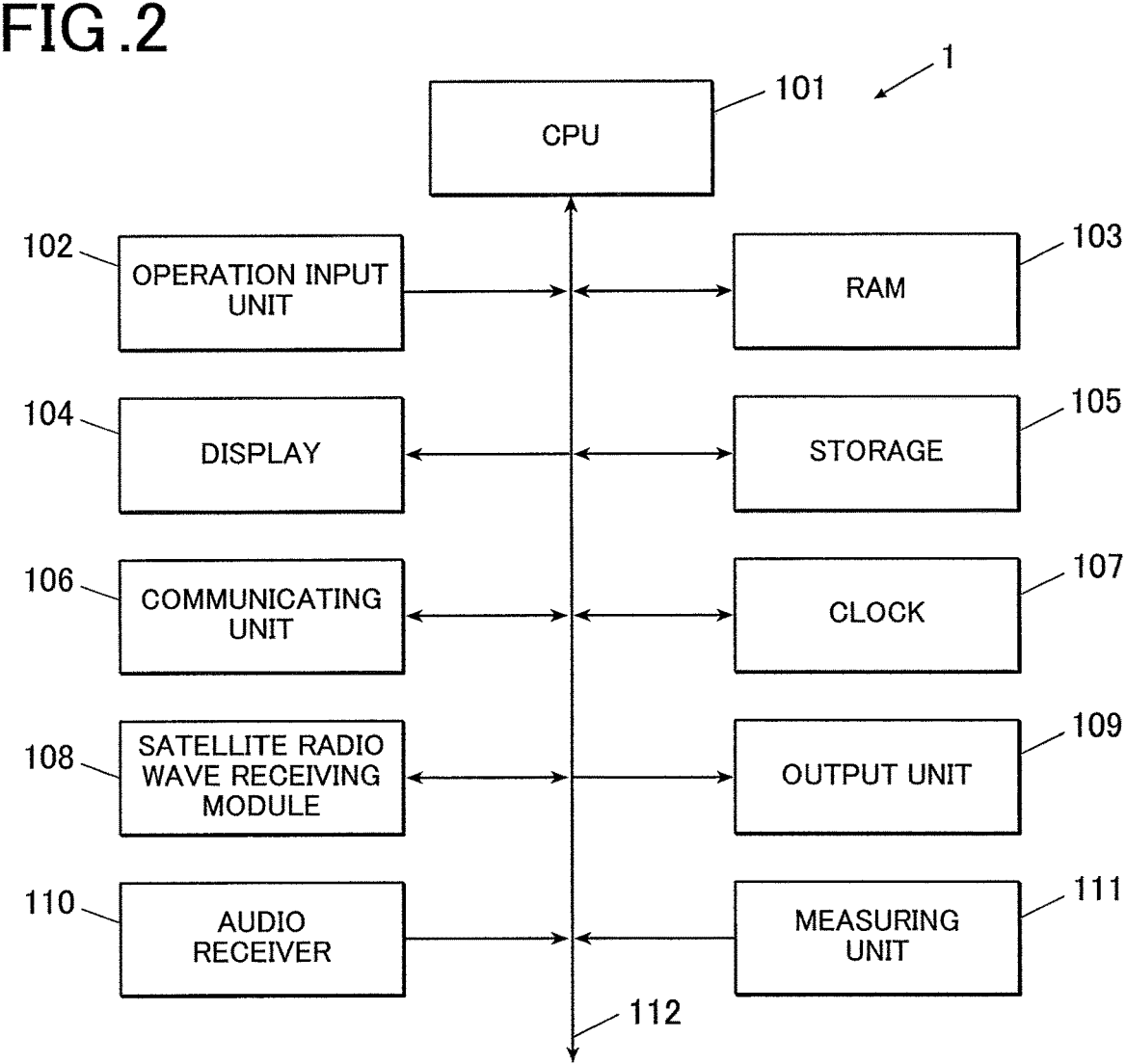
FIG. 2 is a block diagram showing a functional configuration of a smart watch.

Next, the inner configuration of the smart watch 1 will be described. FIG. 2 shows the inner configuration of the smart watch 1.

As shown in FIG. 2, the smart watch 1 includes a CPU (central processing unit) 101, an operation input unit 102, a RAM (random access memory) 103, a display 104, a storage 105, a communicating unit 106, a clock 107, a satellite radio wave receiving module 108, an output unit 109, an audio receiver 110, and a measuring unit 111. These individual units are connected to each other via a bus 112.

The CPU 101 reads out the system program which is stored in the storage 105, loads the program into the work area in the RAM 103, and controls the individual units in accordance with the system program. Further, the CPU 101 reads out the process programs which are stored in the storage 105, loads the programs into the work area, and executes various types of processes such as the after-mentioned emotion information obtaining process. In such way, the CPU 101 has functions of the first obtaining process, the second obtaining process, the audio input control process and the notification process. Furthermore, the CPU 101 is configured so that applications for recording and analyzing various types of data obtained during the user's activities such as running, bicycling, swimming, trekking, fishing, skiing, snowboarding, surfing and the like, and various types of data obtained in the user's daily life can be executed.

The operation input unit 102 includes push button switches 102a to 102c, a touch sensor which is provided on the display 104 and the like. The operation input unit 102 receives an input operation performed by a user, converts the content of operation into an electronic signal, and outputs the electronic signal to the CPU 101.

The RAM 103 is a volatile memory. The RAM 103 includes the work area for storing various types of programs which are to be executed, data concerning those various types of programs and the like.

The display 104 is formed of an LCD (liquid crystal display), a CRT (cathode ray tube) or the like, and the display 104 carries out screen display in accordance with the display control signals from the CPU 101. As described above, the touch sensor is provided on the display screen of the display 104.

The storage 105 is formed of an HDD (hard disk drive) which includes a magnetic recording medium or the like. In the storage 105, the system program and the process programs which are to be executed by the CPU 101, an application program such as a Web server program, data required for executing these programs and the like are stored. As for the process programs, programs for executing various types of processes such as the after-mentioned emotion information obtaining process are included.

These programs are stored in the storage 105 in the form of computer readable program codes. The CPU 101 sequentially executes operations in accordance with the program codes.

In the storage 105, various types of data which are input by the user and various types of data which are sent from the smartphone 2 are stored. For example, the storage 105 may be configured to store the obtained audio information, emotion information and the like.

The communicating unit 106 carries out communication control of information between the smart watch 1 and a portable device such as a smartphone and/or an external device such as a personal computer which are connected via a predetermined wireless communication circuit (for example, a wireless PAN (personal area network) such as Bluetooth (registered trademark)). Further, the communicating unit 106 carries out in advance the communication setting process called pairing, for example, to exchange the device information and the recognition key data with the communication correspondent(s) through a wireless signal. By carrying out such exchange, thereafter, without carrying out the communication setting process every time, the communication connection between the smart watch 1 and the smartphone 2 will be disconnected if they are distanced to the range where the radio wave does not reach, and the communication connection between them will be automatically connected if the smart watch 1 and the smartphone 2 are close to each other to be within the range where the radio wave reaches, for example.

The clock 107 includes a timer, a counting circuit and the like, for example, and counts the present time and obtains time information. The clock 107 further outputs the obtained time information to the CPU 101.

The satellite radio wave receiving module 108 includes an antenna (not shown). The satellite radio wave receiving module 108 captures, receives and demodulates a radio wave coming from a positioning satellite of a positioning system such as a GPS (global positioning system), and outputs the obtained present location information and present time information to the CPU 101. The satellite radio wave receiving module 108 can control the turning on and off of power supply on the basis of an operation performed by the user independently from the operation of the turning on and off of power of the entire smart watch 1.

The output unit 109 includes a vibration motor which generates a vibration, a speaker and the like. The output unit 109 outputs a vibration and a sound (audio) in accordance with a signal which is sent from the CPU 101.

The audio receiver 110 includes a microphone and the like. The audio receiver 110 converts the sound (audio) which is input by a user into audio information of an electronic signal and outputs the information to the CPU 101.

The measuring unit 111 includes various types of sensors and obtains predetermined measurement results. The measuring unit 111 can obtain, but not limited to, temperature, humidity, atmospheric pressure, altitude, orientation, pedometer count, pulse rate and the like, for example, by outputting the signals which are output from the various types of sensors to the CPU 101, for example. The measuring unit 111 may be a unit which detects acceleration and the like which momentarily occurs with respect to the smart watch 1 and detects whether the user has received a strong shock by outputting the detected acceleration and the like to the CPU 101.

<<Configuration of the Smartphone 2>>

Figure 3:
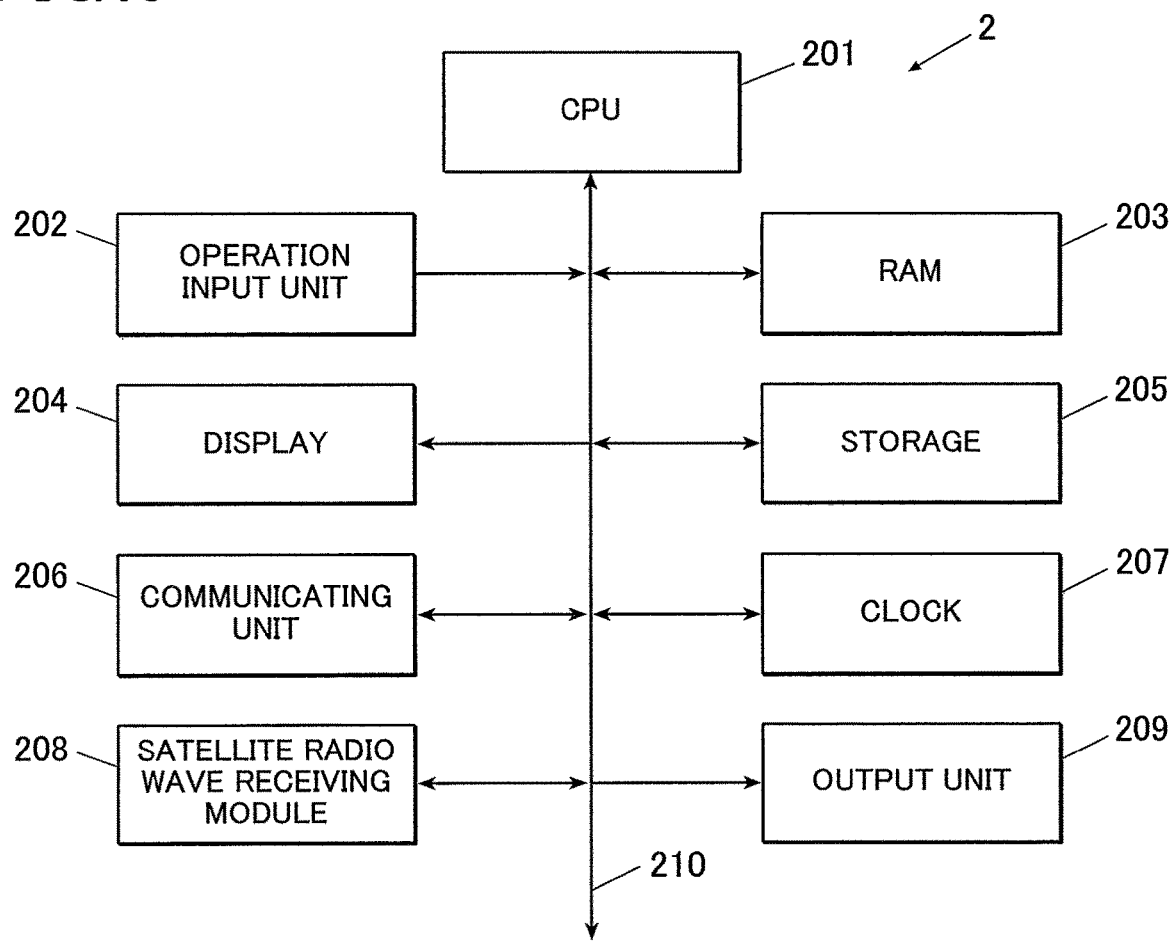
FIG. 3 is a block diagram showing a functional configuration of a smartphone.

Next, the inner configuration of the smartphone 2 will be described. FIG. 3 shows the inner configuration of the smartphone 2.

As shown in FIG. 3, the smartphone 2 includes a CPU 201, an operation input unit 202, a RAM 203, a display 204, a storage 205, a communicating unit 206, a clock 207, a satellite radio wave receiving module 208, and an output unit 209. These individual units are connected to each other via a bus 210.

The CPU 201, the operation input unit 202, the RAM 203, the display 204, the storage 205, the communicating unit 206, the clock 207, the satellite radio wave receiving module 208, and the output unit 209 respectively may be the same as the CPU 101, the operation input unit 102, the RAM 103, the display 104, the storage 105, the communicating unit 106, the clock 107, the satellite radio wave receiving module 108, and the output unit 109 of the smart watch 1. Different parts will mainly be described.

The CPU 201 reads out the system program which is stored in the storage 205, loads the system program into the work area in the RAM 203, and controls the individual units in accordance with the system program. The CPU 201 further reads out the process programs which are stored in the storage 205, loads the process programs into the work area, and executes various types of processes.

The storage 205 is formed of an HDD which includes a magnetic recording medium or the like. In the storage 205, the system program and the process programs which are to be executed by the CPU 201, an application program such as a Web browser and the like, data required for executing these programs, and the like are stored. The process programs include programs for executing various types of processes.

The communicating unit 206 carries out communication with the smart watch 1 which is paired with the smartphone 2 and an external device such as a server device (not shown) on the communication network and the like, and sends and receives data to and from the smart watch 1 and the external device.

<<Operation of the Smart Watch 1>>

Figure 4:
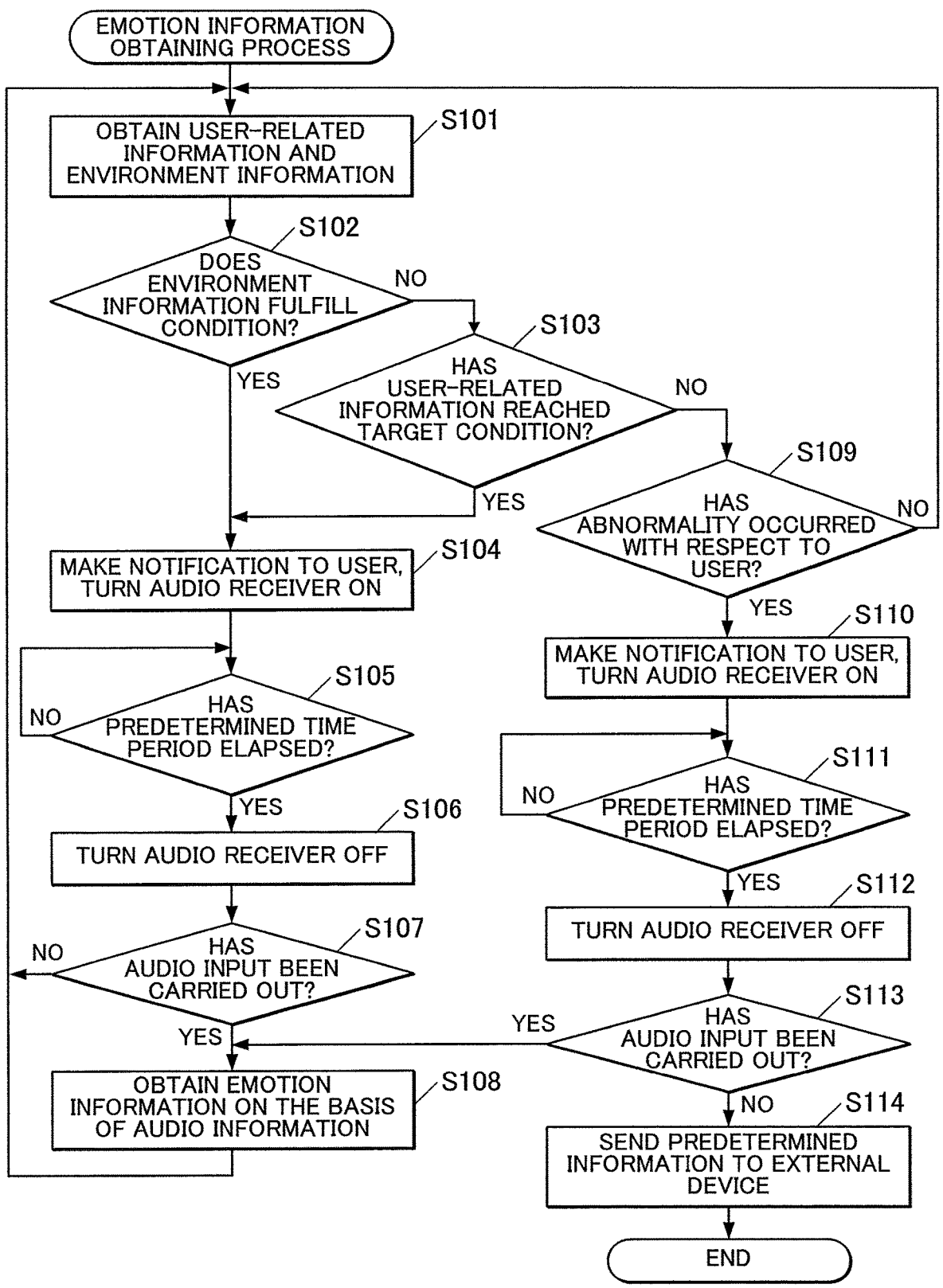
FIG. 4 is a flowchart showing an example of the emotion information obtaining process according to an embodiment.

The emotion information obtaining process which is carried out by the smart watch 1 of the embodiment will be described with reference to FIG. 4. FIG. 4 shows the flowchart of an example of the emotion information obtaining process according to the embodiment.

The timing when the emotion information obtaining process of the embodiment is to be carried out is not specifically limited. However, for example, the emotion information obtaining process is to be carried out while an activity application which records and analyzes various types of data obtained during an activity is being executed, and the emotion information obtaining process ends as the activity application ends.

As shown in FIG. 4, the CPU 101 first obtains user-related information and environment information on the basis of the information obtained by the satellite radio wave receiving module 108 or the measuring unit 111 (step S101). Here, as for the user-related information, information that is different for each user, for example, moving distance, moving speed, pedometer count, pulse rate, elapsed time, whether there has been a shock or not, information input by the user in advance, various types of information which are derived from the above information, and the like are included. As for the various types of information which are derived from the above information, an amount of calorie burnt and the like may be suggested, for example. The amount of calorie burnt is calculated on the basis of the weight of the user which is input by the user in advance, the type of exercise selected by the user, the time elapsed since the start of the exercise, and the like. Further, the environment information is information based on external environment which does not differ for each user. For example, the environment information includes present time, temperature, humidity, atmospheric pressure, altitude, orientation, sea tide, various types of information that are derived from the above information, and the like.

Next, the CPU 101 determines whether the environment information which is obtained in the process of step S101 fulfills a predetermined condition (step S102). The predetermined condition is set in advance according to the type of activity application that is being executed. For example, as for the predetermined condition, a condition that the temperature, humidity or atmospheric pressure is higher than a value which is set in advance, a condition that the environmental state has changed to a specific state which is set in advance, and the like may be suggested. As for the condition that the environmental state has changed to a specific state, a condition that the environmental state has changed to a good fishing state that is derived on the basis of the sea tide information and the like during fishing, a condition that the good fishing state has ended, and the like may be suggested.

If it is determined that the environment information fulfills the predetermined condition (step S102: YES), the CPU 101 carries out the after-mentioned process of step S104.

If it is determined that the environment information does not fulfill the predetermined condition (step S102: NO), the CPU 101 determines whether the user-related information which is obtained in step S101 has reached a predetermined target condition (step S103). This target condition is predetermined according to the type of activity application which is being executed. For example, as for the target condition, a target condition that the user's moving distance is greater than or equal to the distance which is set in advance, a target condition that the user's pedometer count is greater than or equal to the pedometer count which is set in advance, a target condition that the user's amount of calorie burnt is greater than or equal to the value which is set in advance, a target condition that the elapsed time is greater than or equal to the time period which is set in advance, a target condition that the user's present location has reached the location which is set in advance, a target condition that the user's present location has entered a predetermined distance range centered around the location which is set in advance, a target condition that the specific activity which is set in advance has ended, a target condition that the specific activity has changed to the specific state which is set in advance, and the like may be suggested. As for the target condition that the specific activity has ended, for example, ending of a pre-set sport match, race or training, ending of sliding in skiing/snowboarding, and the like may be suggested. Further, as for the target condition that the specific activity has changed to the specific state, for example, starting of a pre-set sport match, race or training, achieving of a pre-set number of catch of fish in fishing, starting of sliding in skiing/snowboarding, and the like may be suggested. The target condition may be set in advance by the user carrying out an operation input or may be set by the CPU 101.

If it is determined that the user-related information has reached the target condition (step S103: YES), the CPU 101 makes a notification so as to cause the user to carry out audio input to the audio receiver 110 and turns the audio receiver 110 on (step S104). For example, the CPU 101 makes the notification by displaying a screen for causing the user to carry out audio input on the display 104 or by outputting a vibration and a sound (audio) for causing the user to carry out audio input with the output unit 109. As for the screen to be displayed on the display 104, an image or an icon to which the user be tempted to speak to may be displayed. For example, an image of a character or an animal which the user likes, the user's family or the like can be displayed. Further, since the CPU 101 starts to obtain audio information by turning the audio receiver 110 on, the CPU 101 can obtain the audio information according to the timing when it is determined that the user-related information or the environment information has fulfilled the predetermined condition. In such way, the audio information can be obtained at the timing when the user's emotion tends to change and more accurate emotion information can be obtained. Further, since the sound (audio) that is not suited for obtaining emotion information can be prevented from being included in the audio information to be obtained, the burden that is caused during the analysis of the audio information can be reduced.

Next, the CPU 101 determines whether a predetermined time period has elapsed (step S105). In particular, the CPU 101 causes the clock 107 to calculate the time elapsed since when the notification has been made to the user in the process of step S104 and determines whether the elapsed time has exceeded the predetermined time period which is set in advance.

If it is determined that the predetermined time period has not elapsed (step S105: NO), the CPU 101 carries out the process of step S105 again.

If it is determined that the predetermined time period has elapsed (step S105: YES), the CPU 101 turns the audio receiver 110 off (step S106). In such way, the CPU 101 obtains the audio information of the period from when the audio receiver 110 is turned on to when the audio receiver 110 is turned off.

Next, the CPU 101 determines whether the user has carried out audio input (step S107). In particular, the CPU 101 analyzes the obtained audio information and determines whether the user's voice (audio) is included in the obtained audio information.

If it is determined that audio input has been carried out (step S107: YES), the CPU 101 obtains emotion information on the basis of the audio information (step S108). The conventional well-known technique can be adopted as the obtaining method of emotion information, and by using such method, the CPU 101 analyzes the audio information that is based on the voice (audio) which is input by the user and obtains the emotion information which indicates the user's emotion. In the embodiment, the emotion information indicates in which emotion state, "distress, anger", "anxiety", "calm" or "joy", the user who input the voice (audio) is. The CPU 101 stores the obtained emotion information in the storage 105 and thereafter, carries out the process of step S101 again.

If it is determined that audio input has not been carried out (step S107: NO), the CPU 101 carries out the process of step S101 again.

Here, if it is determined that the user-related information has not reached the target condition in the process of step S103 (step S103: NO), the CPU 101 determines whether an abnormality has occurred with respect to the user on the basis of the user-related information which is obtained in the process of step S101 (step S109). For example, in a case where the measuring unit 111 detects that a strong shock has been applied to the user, the CPU 101 determines that an abnormality has occurred with respect to the user.

If it is determined that an abnormality has not occurred with respect to the user (step S109: NO), the CPU 101 carries out the process of step S101 again.

If it is determined that an abnormality has occurred with respect to the user (step S109: YES), the CPU 101 carries out the processes of steps S110 to S113. Since the processes of steps S110 to S113 are the same as the processes of steps S104 to S107, the explanations are omitted.

If it is determined that audio input has been carried out in the process of step S113 (step S113: YES), the CPU 101 carries out the process of step S108.

If it is determined that audio input has not been carried out in the process of step S113, the CPU 101 sends predetermined information which is based on the user-related information to an external device (step S114). In the case where it is determined that an abnormality has occurred with respect to the user and there is no audio input, it can be assumed that the abnormality that has occurred with respect to the user is severe to the extent that the user cannot speak. Therefore, the CPU 101 sends the user's present location, moving route, pulse rate, and the like to an external device as the predetermined information, and thereby a notification of the user's emergency is made to call for help. As for the external device to which the predetermined information is to be sent, for example, another user's smartphone 2 and the like which are set in advance may be suggested. After sending the predetermined information to an external device, the CPU 101 ends the emotion information obtaining process.

The emotion information obtaining process is carried out in the way as described above.

Here, although the emotion information obtaining process is to be carried out while an activity application is being executed, this is not limitative in any way. The emotion information obtaining process can be carried out when the smart watch 1 is used in a normal manner. In such case, for example, the CPU 101 may obtain the information indicating the commuting route and the like of the user every day as the user-relating information, and may determine whether the obtained information is different from the information obtained in the past in the process of step S102. That is, if the information indicating the commuting route and the like of the user is different from the information obtained in the past, there is a great possibility that the user's emotion is also different, and therefore, it may be determined that the condition is fulfilled in the process of step S102 and emotion information may be obtained.

Further, although a similar notification is to be made in the process of step S104 in either of the cases where it is determined that the environment information has fulfilled the predetermined condition or where it is determined that the user-related information has reached the target condition, this is not limitative in any way. For example, different notifications may be made according to the case where it is determined that the environment information has fulfilled the predetermined condition and the case where it is determined that the user-related information has reached the target condition. Furthermore, different notifications may be made according to the content of condition which the environment information has fulfilled and the content of target condition which the user-related information has reached.

Similarly, the length of elapsed time which is to be determined in the process of step S105 may be changed depending on the condition which the environment information has fulfilled and the target condition which the user-related information has reached.

Further, although emotion information is obtained on the basis of the audio information in the process of step S108, this is not limitative in any way. For example, in the case where it is determined that an abnormality has occurred with respect to the user in the process of step S109, not only is emotion information to be obtained on the basis of the audio information but also the information on how to deal with the abnormality may be provided to the user. Furthermore, the information as to how to deal with the abnormality may be changed depending on the obtained emotion information.

Moreover, although the CPU 101 determines that an abnormality has occurred with respect to the user in the process of step S109 in the case where the measuring unit 111 detects that a strong shock has been applied to the user, this is not limitative in any way. For example, it may also be determined that an abnormality has occurred with respect to the user in a case where the moving speed of the user is zero, that is, the state where the user is not moving continues for a predetermined time period or longer, in a case where a predetermined time period or longer has elapsed since the present location of the user has drifted away from the route which is set in advance, in a case where the detected pulse rate of the user is outside the normal value range, and the like.

Further, although the processes similar to those of steps S104 to S107 are carried out in the processes of steps S110 to S113, this is not limitative in any way. For example, the notification to be made in the process of step S110 and the notification to be made in the process of step S104 may be different, and the length of the elapsed time to be determined in the process of step S111 and the length of the elapsed time to be determined in the process of step S105 may be different.

Furthermore, although the CPU 101 carries out the process of step S114 and ends the emotion information obtaining process in the case where it is determined that audio input is not carried out in the process of step S113, this is not limitative in any way. That is, the CPU 101 may carry out the process of step S101 again without carrying out the process of step S114 in the case where it is determined that audio input is not carried out.

Moreover, although the predetermined information is sent to another user's smartphone 2 which is set in advance in the process of step S114, this is not limitative in any way. For example, the predetermined information may be sent to another user's smart watch 1, PC, tablet terminal or the like and the predetermined information may be sent to the terminals of a security company, the police, a fire station, and the like.

Technical Advantages of the Embodiment

According to the embodiment, the smart watch 1 includes the audio receiver 110 which receives a voice (audio) of the user and converts the input voice (audio) into audio information and the CPU 101 which obtains emotion information on the basis of the audio information which is converted in the audio receiver 110 and obtains user-related information or environment information, and the CPU 101 obtains emotion information on the basis of the audio information of a predetermined timing that is decided on the basis of the obtained user-related information or environment information. Therefore, emotion information can be obtained at the timing when there is a great possibility that the user's emotion changes and more accurate emotion information can be obtained.

Further, the CPU 101 turns the audio receiver 110 on or off on the basis of the obtained user-related information or environment information. Therefore, a sound (audio) that is not suited for obtaining emotion information can be prevented from being included in the audio information to be obtained and more accurate emotion information can be obtained. Furthermore, since the audio information to be obtained can be restricted, the burden that is caused during the analysis of audio information to obtain emotion information can be reduced.

Moreover, the CPU 101 obtains emotion information on the basis of the audio information according to the timing when it is determined that the user-related information or the environment information has fulfilled the predetermined condition on the basis of the obtained user-related information or environment information. Therefore, the emotion information can be obtained at the timing when there is a great possibility that the user's emotion changes.

Further, the CPU 101 obtains the user-related information in every predetermined time period and obtains emotion information on the basis of the audio information according to the timing when it is determined that the obtained user-related information is different from the user-related information obtained in the past. Therefore, emotion information can be obtained at the timing when there is a great possibility that the user's emotion changes.

Furthermore, the CPU 101 makes a notification so as to cause the user to carry out audio input to the audio receiver 110 on the basis of the obtained user-related information or environment information, and obtains emotion information on the basis of the audio information according to the timing when the notification is made. Therefore, the audio information including the sound (audio) suited for obtaining the user's emotion information can be obtained more reliably.

MODIFICATION EXAMPLE

The modification example of the emotion information obtaining system 100 of the above described embodiment will be described. The aspects other than the aspects described below are similar to those in the emotion information obtaining system 100 of the above described embodiment.

Figure 5:
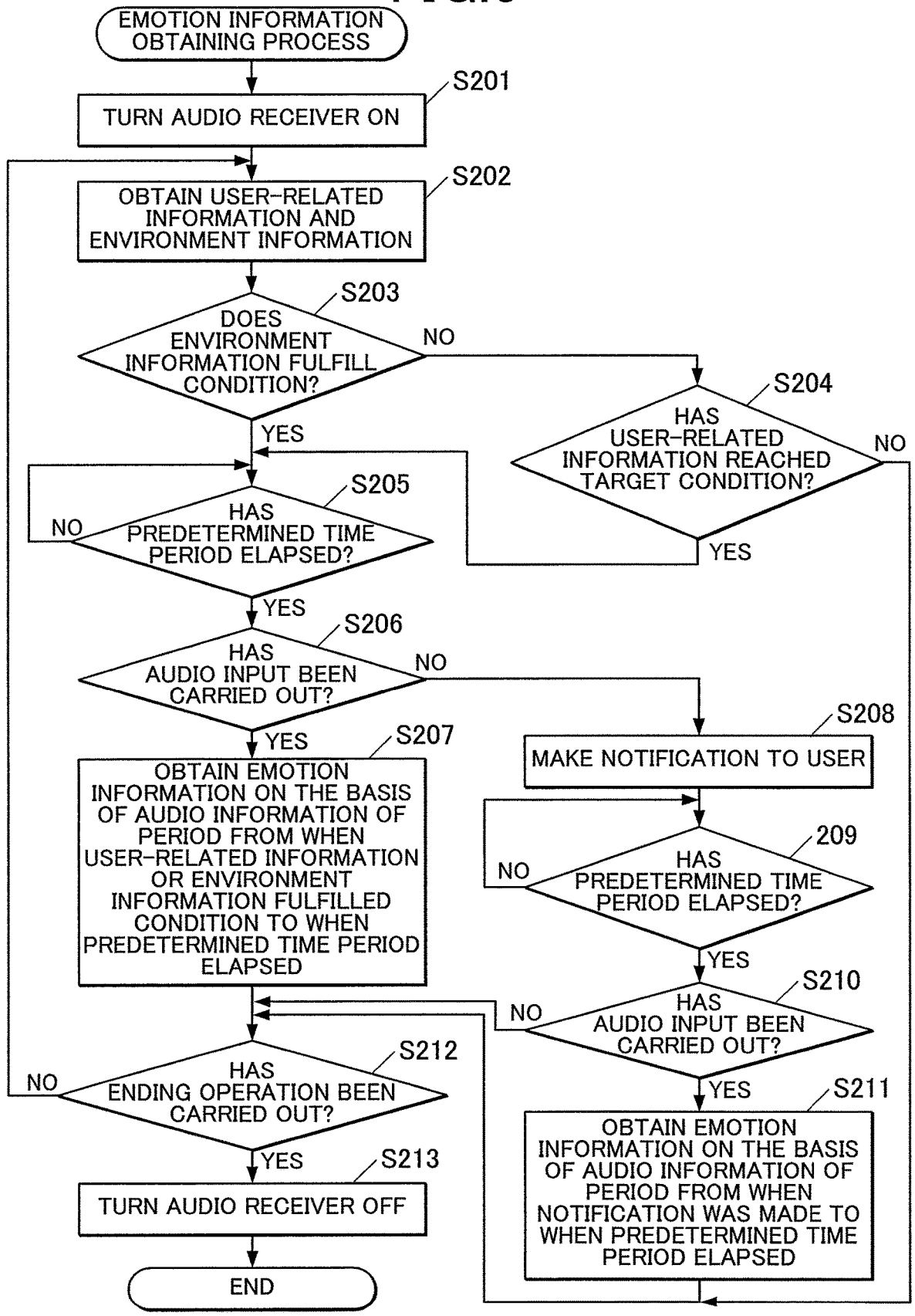
FIG. 5 is a flowchart showing an example of the emotion information obtaining process according to a modification example.

The emotion information obtaining system according to the modification example differs from the emotion information obtaining system 100 of the above described embodiment in the following aspects. That is, the emotion information obtaining system according to the modification example carries out the emotion information obtaining process in the way as shown in FIG. 5. FIG. 5 is the flowchart showing an example of the emotion information obtaining process according to the modification example.

First, the CPU 101 turns the audio receiver 110 on (step S201). In such way, the CPU 101 starts the obtaining of audio information.

Next, the CPU 101 obtains user-related information and environment information on the basis of the information obtained by the satellite radio wave receiving module 108 or the measuring unit 111 (step S202).

Next, the CPU 101 determines whether the environment information obtained in step S202 fulfills a predetermined condition which is set in advance (step S203).

If it is determined that the environment information fulfills the predetermined condition (step S203: YES), the CPU 101 carries out the after-mentioned process of step S205.

If it is determined that the environment information does not fulfill the predetermined condition (step S203: NO), the CPU 101 determines whether the user-related information obtained in the process of step S202 has reached the predetermined target condition (step S204).

If it is determined that the user-related information has not reached the predetermined target condition (step S204: NO), the CPU 101 omits the after-mentioned processes of steps S205 to S211 and carries out the process of step S212.

If it is determined that the user-related information has reached the predetermined target condition (step S204: YES), the CPU 101 determines whether a predetermined time period has elapsed (step S205). In particular, the CPU 101 causes the clock 107 to calculate the time elapsed since it is determined that the environment information has fulfilled the predetermined condition in the process of step S203 or since it is determined that the user-related information has reached the target condition in the process of step S204, and determines whether the elapsed time has exceeded the predetermined time period which is set in advance.

If it is determined that the predetermined time period has not elapsed (step S205: NO), the CPU 101 carries out the process of step S205 again.

If it is determined that the predetermined time period has elapsed (step S205: YES), the CPU 101 determines whether the user has carried out audio input (step S206). In particular, the CPU 101 analyzes the obtained audio information on a real-time basis and determines whether the user's voice (audio) is included.

If it is determined that audio input has been carried out (step S206: YES), the CPU 101 obtains emotion information on the basis of the audio information of the period from when it is determined that the environment information has fulfilled the predetermined condition in the process of step S203 or when it is determined that the user-related information has reached the target condition in the process of step S204 to when it is determined that the predetermined time period has elapsed in the process of step S205 (step S207). Further, the CPU 101 stores the obtained emotion information in the storage 105 and carries out the after-mentioned process of step S212.

If it is determined that audio input has not been carried out (step S206: NO), the CPU 101 makes a notification so as to cause the user to carry out audio input to the audio receiver 110 (step S208).

Next, the CPU 101 determines whether a predetermined time period has elapsed (step S209). In particular, the CPU 101 causes the clock 107 to calculate the time elapsed since the notification is made to the user in the process of step S208, and determines whether the elapsed time has exceeded the predetermined time period which is set in advance.

If it is determined that the predetermined time period has not elapsed (step S209: NO), the CPU 101 carries out the process of step S209 again.

If it is determined that the predetermined time period has elapsed (step S209: YES), the CPU 101 determines whether the user has carried out audio input (step S210). In particular, the CPU 101 analyzes the obtained audio information on a real-time basis and determines whether the user's voice (audio) is included in the obtained audio information.

If it is determined that audio input has been carried out (step S210: YES), the CPU 101 obtains emotion information on the basis of the audio information of the period from when the notification is made to the user in the process of step S208 to when it is determined that the predetermined time period has elapsed in the process of step S209 (step S211). Further, the CPU 101 stores the obtained emotion information in the storage 105 and carries out the after-mentioned process of step S212.

If it is determined that audio input has not been carried out (step S210: NO), the CPU 101 omits the process of step S211 and carries out the after-mentioned process of step S212.

Next, the CPU 101 determines whether an ending operation is input by the user (step S212). In particular, for example, in a case where an operation for turning the audio receiver 110 off is input or in a case where an operation for ending the activity application is input, the CPU 101 determines that the ending operation is input.

If it is determined that the ending operation is not input (step S212: NO), the CPU 101 carries out the process of step S202 again.

If it is determined that the ending operation is input (step S212: YES), the CPU 101 turns the audio receiver 110 off (step S213) and ends the emotion information obtaining process.

The emotion information obtaining process is carried out in the way as described above.

Here, although whether an abnormality has occurred with respect to the user is not determined in the emotion information obtaining process according to the above described modification example, this is not limitative in any way. That is, the CPU 101 may determine whether an abnormality has occurred with respect to the user in the similar way as described in step S109 of the emotion information obtaining process of the above embodiment. In such case, if it is determined that an abnormality has occurred with respect to the user and the user does not carry out audio input for a predetermined time period, predetermined information may be configured to be sent to an external device in the similar way as described in step S114 of the emotion information obtaining process of the above embodiment.

Further, in the emotion information obtaining process according to the above described modification example, the obtaining of audio information starts with the process of step S201, emotion information is obtained on the basis of the audio information of the period from when it is determined that the user-related information or the environment information has fulfilled the predetermined condition to when it is determined that the predetermined time period has elapsed in the process of step S207, and emotion information is obtained on the basis of the audio information of the period from when the notification is made to the user to when it is determined that the predetermined time period has elapsed in the process of step S211. However, this is not limitative in any way. For example, in the process of step S201, the CPU 101 may obtain emotion information along with the audio information by starting the obtaining of audio information and starting the analyzing of the obtained audio information at the same time. In such case, the process of step S206 may be omitted. Furthermore, in the process of step S207, the CPU 101 may extract, from the obtained emotion information, the emotion information of the period from when it is determined that the user-related information or the environment information has fulfilled the predetermined condition to when it is determined that the predetermined time period has elapsed, and obtain the extracted emotion information. Moreover, in the case where the process of step S206 is to be carried out, the CPU 101 may extract, from the obtained emotion information, the emotion information of the period from when the notification is made to the user to when it is determined that the predetermined time period has elapsed, and obtain the extracted emotion information in the process of step S211.

Further, although emotion information is obtained in step S207 or step S211 while the audio information is being obtained throughout steps S201 to S213 in the emotion information obtaining process according to the above described modification example, this is not limitative in any way. For example, the CPU 101 may store in the storage 105 information that indicates the period from when it is determined that the user-related information or the environment information has fulfilled the predetermined condition to when it is determined that the predetermined time period has elapsed after it is determined that the predetermined time period has elapsed in the process of step S205, and may omit the processes of steps S206 to S211. Then, on the basis of the information that indicates the above described time period, the CPU 101 may analyze the audio information of the period from when it is determined that the user-related information or the environment information has fulfilled the predetermined condition to when it is determined that the predetermined time period has elapsed, and obtain emotion information at any timing after the process of step S213.

Furthermore, although the CPU 101 is to carry out the processes of steps S208 to S211 when it is determined that audio input has not been carried out in the process of step S206, this is not limitative in any way. That is, the CPU 101 may omit the processes of steps S208 to S211 and carry out the process of step S212 when it is determined that audio input has not been carried out.

Moreover, in the process of step S207, emotion information is obtained on the basis of the audio information of a predetermined timing which is decided on the basis of the user-related information or the environment information, that is, the audio information of the period from when it is determined that the user-related information or the environment information has fulfilled the predetermined condition to when it is determined that the predetermined time period has elapsed. However, this is not limitative in any way. For example, in the emotion information obtaining process according to the above described modification example, since the obtaining of audio information has been started in advance, the CPU 101 may obtain emotion information on the basis of not only the audio information of the predetermined timing that is decided on the basis of the user-related information or the environment information but also on the basis of the audio information of a timing that is prior to the timing by a predetermined time period and the audio information of a timing that is after the timing by a predetermined time period. In such way, how the user's emotion information changes with time elapsing can be confirmed. Further, the CPU 101 may obtain the overall emotion information on the basis of the emotion information obtained on the basis of the audio information of each of the above timings.

Technical Advantages of the Modification Example

As described above, according to the modification example, the CPU 101 starts the obtaining of audio information in advance and obtains emotion information on the basis of the audio information when it is determined that the user-related information or the environment information has fulfilled the predetermined condition. Therefore, in addition to the advantages that can be obtained in the above embodiment, there is an advantage that the audio information suited for obtaining emotion information can be obtained more reliably.

Further, according to the modification example, in the case where emotion information is obtained without making a notification to the user, the user's emotion can be prevented from altering even slightly due to the notification being made. Therefore, more accurate emotion information can be obtained.

Furthermore, in the case where the CPU 101 obtains emotion information on the basis of the audio information of the predetermined timing that is decided on the basis of the user-related information or the environment information, the audio information of a timing that is prior to the timing by a predetermined time period and the audio information of a timing that is after the timing by a predetermined time period, and obtains the overall emotion information on the basis of the emotion information obtained on the basis of the audio information of each of the above timings, the overall emotion of the user during a certain time period prior to and after the predetermined timing can be confirmed. Further, in such case, compared to the case where emotion information is obtained only on the basis of the audio information of the predetermined timing, the emotion information which more accurately indicates the user's emotion can be obtained.

<<Other>>

Here, the above embodiment and modification example are merely examples of the preferred emotion information obtaining system according to the present invention, and they are not limitative in any way.

For example, in the above described embodiment and modification example, the smart watch 1 which is included in the emotion information obtaining system 100 carries out the above described emotion information obtaining process. However, this is not limitative in any way. For example, another terminal device such as the smartphone 2 or the like may carry out the above described emotion information obtaining process. In such case, another terminal device such as the smartphone 2 or the like, for example, may include the audio receiver and the measuring unit. Further, a couple of terminal devices such as the smart watch 1 and the smartphone 2, for example, may cooperate to carryout the above described emotion information obtaining process. Furthermore, a terminal device such as the smart watch 1 or the smartphone 2, for example, may cooperate with a server device (not shown) which is connected via a network to carry out the above described emotion information obtaining process. In such case, for example, the terminal device may output the obtained audio information to the server device, and the server device may obtain emotion information on the basis of the input audio information and output the obtained emotion information to the server device. In the case where the system includes a couple of terminal devices or a terminal device and a server device, it is possible to select arbitrarily which device includes the individual units, such as the audio receiver which receives audio of the user and converts the input audio into audio information, and the processor which performs the first obtaining process which obtains emotion information on the basis of the audio information which is converted by the audio receiver, and the second obtaining process which obtains the user-related information or the environment information, according to the configuration of the emotion information obtaining system.

Moreover, an electronic device which is mounted in a locomotion device such as a bicycle may carry out the above described emotion information obtaining process. In such case, for example, a notification for causing the user to ride safely or the like can be made on the basis of the obtained emotion information.

Further, in the above described embodiment and modification example, the CPU 101 of the smart watch 1 obtains the user-related information, in particular, the present location information concerning the user, on the basis of the information obtained by the satellite radio wave receiving module 108. However, this is not limitative in any way. For example, the present location information may be obtained by utilizing the network location information such as in the in-door positioning technique.

Furthermore, in the above described embodiment and modification example, the notification is made by displaying the screen for causing the user to carry out audio input on the display 104 or by outputting a vibration or a sound (audio) for causing the user to carry out audio input with the output unit 109 when the user-related information or the environment information has fulfilled the predetermined condition. However, this is not limitative in any way. For example, the CPU 101 may make the notification by outputting a sound (audio), an image, a paper-based medium or the like to an external device other than the smart watch 1, for example, the smartphone 2 or a music player, a head mount display, a printer or the like which are not shown in the drawings.

Moreover, in the above described embodiment and modification example, the emotion information indicates four categories of emotion which are "distress, anger", "anxiety", "calm" and "joy". However, this is not limitative in any way. For example, the emotion information may indicate the user's emotion in two or three categories or may indicate the user's emotion in five or more categories. Further, for example, the emotion information may indicate the user's emotion in a plurality of types of categories along with the level of each emotion.

Furthermore, in the above described embodiment, an example where a non-volatile memory of hard disk, semiconductor or the like is used as a computer readable medium of the program according to the present invention is disclosed. However, this is not limitative in any way. As for other computer readable media, a portable-type recording medium such as a CD-ROM or the like can be applied. Moreover, a carrier wave can be applied as a medium which provides data of the program according to the present invention via a communication circuit.

Although various exemplary embodiments have been shown and described, the present invention is not limited to the embodiments shown. Therefore, the scope of the invention is intended to be limited sole by the scope of the claims that follow and their equivalents.

What is claimed is:

1. An electronic device, comprising:
   an audio receiver which receives audio of a user and converts the audio into audio information; and
   a processor which performs:
   first obtaining of emotion information on a basis of the audio information converted by the audio receiver; and
   second obtaining of user-related information or environment information, wherein, in the first obtaining,
   the processor decides a predetermined timing to obtain the audio information on a basis of the user-related information or the environment information obtained in the second obtaining and obtains the emotion information on a basis of the audio information at the predetermined timing,
   first emotion information is obtained on a basis of the audio information of the predetermined timing which is decided on the basis of the user-related information or the environment information obtained in the second obtaining,
   second emotion information is obtained on a basis of the audio information of a first timing that is prior to the predetermined timing by a predetermined time period,
   third emotion information is obtained on a basis of the audio information of a second timing that is after the predetermined timing by the predetermined time period, and
   overall emotion information is obtained on a basis of all emotion information which is obtained.

2. The electronic device of claim 1, wherein the processor further performs controlling audio input by turning the audio receiver on or off on the basis of the user-related information or the environment information obtained in the second obtaining.

3. The electronic device of claim 1, wherein, in the first obtaining, the emotion information is obtained on the basis of the audio information according to the predetermined timing when it is determined that a predetermined condition is fulfilled on the basis of the user-related information or the environment information obtained in the second obtaining.

4. The electronic device of claim 2, wherein, in the first obtaining, the emotion information is obtained on the basis of the audio information according to the predetermined timing when it is determined that a predetermined condition is fulfilled on the basis of the user-related information or the environment information obtained in the second obtaining.

5. The electronic device of claim 1,
   wherein, in the second obtaining, the user-related information is obtained in every predetermined time period, and
   wherein, in the first obtaining, the emotion information is obtained on a basis of the audio information according to the predetermined timing when it is determined that the user-related information obtained in the second obtaining is different from the user-related information obtained in a past.

6. The electronic device of claim 2,
   wherein, in the second obtaining, the user-related information is obtained in every predetermined time period, and
   wherein, in the first obtaining, the emotion information is obtained on a basis of the audio information according to the predetermined timing when it is determined that the user-related information obtained in the second obtaining is different from the user-related information obtained in a past.

7. The electronic device of claim 3,
   wherein, in the second obtaining, the user-related information is obtained in every predetermined time period, and
   wherein, in the first obtaining, the emotion information is obtained on a basis of the audio information according to the predetermined timing when it is determined that the user-related information obtained in the second obtaining is different from the user-related information obtained in a past.

8. The electronic device of claim 4,
   wherein, in the second obtaining, the user-related information is obtained in every predetermined time period, and
   wherein, in the first obtaining, the emotion information is obtained on a basis of the audio information according to the predetermined timing when it is determined that the user-related information obtained in the second obtaining is different from the user-related information obtained in a past.

9. The electronic device of claim 1,
wherein the processor further performs a notification so as to cause the user to carry out audio input to the audio receiver on the basis of the user-related information and the environment information obtained in the second obtaining, and
wherein, in the first obtaining, the emotion information is obtained on a basis of the audio information according to the predetermined timing when the notification is made.

10. The electronic device of claim 2,
wherein the processor further performs a notification so as to cause the user to carry out audio input to the audio receiver on the basis of the user-related information and the environment information obtained in the second obtaining, and
wherein, in the first obtaining, the emotion information is obtained on a basis of the audio information according to the predetermined timing when the notification is made.

11. The electronic device of claim 3,
wherein the processor further performs a notification so as to cause the user to carry out audio input to the audio receiver on the basis of the user-related information and the environment information obtained in the second obtaining, and
wherein, in the first obtaining, the emotion information is obtained on a basis of the audio information according to the predetermined timing when the notification is made.

12. The electronic device of claim 1, wherein, in the second obtaining, the processor obtains the user-related information and the environment information.

13. The electronic device of claim 1,
wherein the user-related information is different for each user and includes moving distance or moving speed, and
wherein the environment information is based on external environment and includes information on a present time or a temperature.

14. An emotion information obtaining system comprising a terminal device and a server device which is connected to the terminal device via a network, the system comprising:
an audio receiver which receives audio of a user and converts the audio into audio information; and
a processor which performs:
first obtaining of emotion information on a basis of the audio information converted by the audio receiver; and
second obtaining of user-related information or environment information,
wherein, in the first obtaining,
the processor decides a predetermined timing to obtain the audio information on a basis of the user-related information or the environment information obtained in the second obtaining and obtains the emotion information on a basis of the audio information at the predetermined timing,
first emotion information is obtained on a basis of the audio information of the predetermined timing which is decided on the basis of the user-related information or the environment information obtained in the second obtaining,
second emotion information is obtained on a basis of the audio information of a first timing that is prior to the predetermined timing by a predetermined time period,
third emotion information is obtained on a basis of the audio information of a second timing that is after the predetermined timing by the predetermined time period, and
overall emotion information is obtained on a basis of all emotion information which is obtained.

15. A non-transitory computer readable storage medium storing a program for causing a computer to function as:
an audio receiver which receives audio of a user and converts the audio into audio information; and
a processor which performs:
first obtaining of emotion information on a basis of the audio information converted by the audio receiver; and
second obtaining of user-related information or environment information,
wherein, in the first obtaining,
the processor decides a predetermined timing to obtain the audio information on a basis of the user-related information or the environment information obtained in the second obtaining and obtains the emotion information on a basis of the audio information at the predetermined timing,
first emotion information is obtained on a basis of the audio information of the predetermined timing which is decided on the basis of the user-related information or the environment information obtained in the second obtaining,
second emotion information is obtained on a basis of the audio information of a first timing that is prior to the predetermined timing by a predetermined time period,
third emotion information is obtained on a basis of the audio information of a second timing that is after the predetermined timing by the predetermined time period, and
overall emotion information is obtained on a basis of all emotion information which is obtained.

16. An emotion information obtaining method, comprising:
audio inputting by an audio receiver where audio of a user is input and where the audio is converted into audio information;
first obtaining by a processor where emotion information is obtained on a basis of the converted audio information; and
second obtaining by the processor where user-related information or environment information is obtained,
wherein, in the first obtaining,
the processor decides a predetermined timing to obtain the audio information on a basis of the user-related information or the environment information obtained in the second obtaining and obtaining the emotion information on a basis of the audio information at the predetermined timing,
obtaining first emotion information on a basis of the audio information of the predetermined timing which is decided on the basis of the user-related information or the environment information obtained in the second obtaining,
obtaining second emotion information on a basis of the audio information of a first timing that is prior to the predetermined timing by a predetermined time period, obtaining third emotion information on a basis of the audio information of a second timing that is after the predetermined timing by the predetermined time period, and obtaining overall emotion information on a basis of all emotion information which is obtained.

17. The emotion information obtaining method of claim 16 further comprising an audio input controlling where an audio receiver is turned on or off on the basis of the user-related information or the environment information obtained in the second obtaining.

18. The emotion information obtaining method of claim 16, wherein, in the first obtaining, the emotion information is obtained on the basis of the audio information according to the predetermined timing when it is determined that a predetermined condition is fulfilled on the basis of the user-related information or the environment information obtained in the second obtaining.

19. The emotion information obtaining method of claim 16, wherein, in the second obtaining, the user-related information is obtained in every predetermined time period, and wherein, in the first obtaining, the emotion information is obtained on a basis of the audio information according to the predetermined timing when it is determined that the user-related information obtained in the second obtaining is different from the user-related information obtained in a past.

20. The emotion information obtaining method of claim 16 further comprising notifying so as to cause the user to carry out audio input to an audio receiver on the basis of the user-related information and the environment information obtained in the second obtaining, wherein, in the first obtaining, the emotion information is obtained on a basis of the audio information according to the predetermined timing when a notification is made.

\* \* \* \* \*